United States Patent [19]

Toya et al.

[11] Patent Number: 5,602,736
[45] Date of Patent: Feb. 11, 1997

[54] VEHICLE SAFETY SYSTEM EQUIPPED WITH MICROCOMPUTER

[75] Inventors: Takaaki Toya; Hideyuki Kaneko; Masaru Odashima; Akira Ogawa, all of Tomioka; Tetsuo Fujishima, Fujisawa; Shuzo Fukuzumi; Junichi Ando, both of Zama, all of Japan

[73] Assignees: Airbag Systems Co., Ltd, Gumma; Nissan Motor Company, Ltd., Yokohama, both of Japan

[21] Appl. No.: 359,993

[22] Filed: Dec. 20, 1994

[30] Foreign Application Priority Data

Dec. 27, 1993 [JP] Japan ................................... 5-347021

[51] Int. Cl.⁶ .................................................. B60R 21/00
[52] U.S. Cl. ........................... 364/424.055; 364/424.034; 364/424.04; 307/10.1; 180/268; 280/735
[58] Field of Search ....................... 364/424.05, 424.03, 364/424.04, 554; 180/268; 280/735; 307/10.1, 9.1

[56] References Cited

U.S. PATENT DOCUMENTS

| | | | |
|---|---|---|---|
| 4,956,842 | 9/1990 | Said | 371/62 |
| 5,073,853 | 12/1991 | Johnson | 395/575 |
| 5,107,245 | 4/1992 | Gesper et al. | 340/436 |
| 5,351,185 | 9/1994 | Takeuchi et al. | 364/184 |
| 5,359,515 | 10/1994 | Weller et al. | 364/424.05 |
| 5,381,334 | 1/1995 | Furui | 364/424.03 |
| 5,398,332 | 3/1995 | Komoda et al. | 395/575 |
| 5,408,645 | 4/1995 | Ikeda et al. | 395/575 |
| 5,422,965 | 6/1995 | Bekki et al. | 364/424.05 |

*Primary Examiner*—Collin W. Park
*Assistant Examiner*—Tan Q. Nguyen

[57] ABSTRACT

A vehicle safety system is equipped with a microcomputer for reliably detecting whether or not programs for controlling activation of passenger protection devices are being properly executed and, based on this detection, preventing problems from occurring in the control operations of the programs. According to one aspect of the invention, the system monitors a program executed on an interrupt basis at prescribed regular time intervals, a repeatedly executed program, and the operations of these programs, synchronously with the execution of the programs, and resets the microcomputer if an error is detected in the execution of either program. According to another, at the time of moving to a subroutine a code peculiar to the subroutine is saved at the entry portion and the saved code is compared with the code peculiar to the executed subroutine at the exit portion for detecting occurrence of error and if error is detected the microcomputer is reset.

10 Claims, 6 Drawing Sheets

VEHICLE SAFETY SYSTEM EQUIPPED WITH MICROCOMPUTER

BACKGROUND OF THE INVENTION

Field of the Invention

The present invention relates to a vehicle safety system equipped with a microcomputer and used to control the activation of air bags, seat belt tensioners and various other passenger protection devices.

Prior Art

Air bags, seat belt tensioners and various other types of vehicle safety devices have been developed for protecting vehicle passengers from impacts arising at the time of collision. The vehicle safety systems employing these passenger protection devices are designed to activate the air bags etc. when a control unit for processing signals from an acceleration sensor discriminates that a collision has occurred. A vehicle safety system of this type is therefore required to optimize the safety device activation control for the particular conditions of the collision. In recent years this has led to increased use of high-performance control units that utilize microcomputers for conducting the various types of data processing required for collision discrimination.

Two types of control programs are used in microcomputer-based control units of this type: an interrupt program which conducts high-priority processing such as collision detection on a periodic interrupt basis and a background program which conducts background processing of various low priority jobs such as power supply voltage monitoring, operation logging and failure diagnosis. Ordinarily these programs are appropriately executed in the microcomputer. Although the use of a microcomputer to process data in this manner enables response to various types of collision situations in the most appropriate manner, it also involves the risk of malfunctions occurring when the processing operations are not properly conducted owing to program runaway or the like.

Upon discrimination of a collision, it is necessary within a short period of from several milliseconds to several tens of milliseconds to supply the ignition element with a prescribed amount of ignition energy by passing a fixed amount of electric current through the ignition element for a period of several milliseconds. Detection of program runaway therefore has to be conducted within a very short time interval. The prior art systems are configured to monitor whether or not a program runaway has occurred by periodically outputting a monitor signal to the CPU (central processing unit) within the fixed-time interrupt routine.

This type of malfunction occurring during program execution in a microcomputer may, however, occur as a program runaway caused by a jump from background processing to an operation code thereof, by a jump from background processing to an operand thereof, or by various other causes. In such a system requiring highly dependable control operation, therefore, there is a need for a method for rapidly and reliably detecting program runaway and other problems arising in the microcomputer so as to be able to prevent malfunctioning of air bags and other passenger protection devices owing to program execution errors.

SUMMARY OF THE INVENTION

It is an object of the present invention to provide a highly reliable vehicle safety system for controlling activation of vehicle safety devices using a microcomputer.

It is another object of the present invention to provide a vehicle safety system which reliably detects whether or not programs loaded into a microcomputer for controlling activation of vehicle safety devices are being properly executed and based on this detection prevents problems from occurring in the control operations.

It is another object of the present invention to provide a vehicle safety system equipped with a control computer which periodically executes a collision discrimination program on an interrupt basis and repeatedly executes a background program for processing prescribed background jobs, which system is able to deal reliably with all of the various program execution errors apt to arise in the course of program execution.

It is another object of the present invention to provide a vehicle safety system equipped with a control computer which periodically executes a collision discrimination program on an interrupt basis and repeatedly executes a background program for processing prescribed background jobs, which system is able to reliably check for jumps within subroutines of the same nesting level.

In accordance with a first aspect of the invention there is provided a vehicle safety system equipped with a microcomputer which has a sensor for detecting vehicle acceleration and a microcomputer for processing the sensor output and in which the microcomputer executes a collision discrimination program on an interrupt basis at prescribed regular time intervals based on the sensor output for discriminating whether or not a collision has occurred and repeatedly executes a background program for processing prescribed background jobs, thereby controlling activation of the vehicle safety devices, the system comprising first monitoring means for monitoring whether or not the collision discrimination program is being executed normally and a second monitoring means for monitoring whether or not the background programs are being executed normally and the microcomputer being reset when at least one of the first and second monitoring means detects an error in program execution.

Thus any program runaway occurring in the collision discrimination program executed at relatively short fixed time intervals can be detected by the first monitoring means, while any program runaway occurring in the background program can be detected by the second monitoring means. These monitoring means reset the computer when program runaway occurs in either of the programs.

In accordance with a second aspect of the invention there is provided a vehicle safety system equipped with a microcomputer which has a sensor for detecting vehicle acceleration and a microcomputer for processing the sensor output and in which the microcomputer executes a collision discrimination program on an interrupt basis at prescribed regular time intervals based on the sensor output for discriminating whether or not a collision has occurred and repeatedly executes background programs for processing prescribed background jobs, thereby controlling activation of the vehicle safety devices, the system comprising means for at the entry portion of the subroutine of each data processing program executed in the microcomputer saving to memory a code peculiar to the subroutine concerned, and means for checking whether the data processing program was properly executed by, at the exit portion of each subroutine, comparing the code of the executed subroutine with the saved code.

When a specific data processing program is to be executed in the microcomputer, a code peculiar to the subroutine concerned is saved to memory before control is passed to the subroutine. When control returns to the main program after the subroutine processing has been completed, the saved code and the code peculiar to the executed subroutine are compared. Thus if a jump occurs within an area of the same nesting level, the problem is detected with high reliability and the microcomputer is reset.

This invention will be better understood and other objects and advantages thereof will be more apparent from the following detailed description of preferred embodiments with reference to the accompanying drawings.

DETAILED DESCRIPTION OF THE PREFERRED EMBODIMENTS

Figure 1:
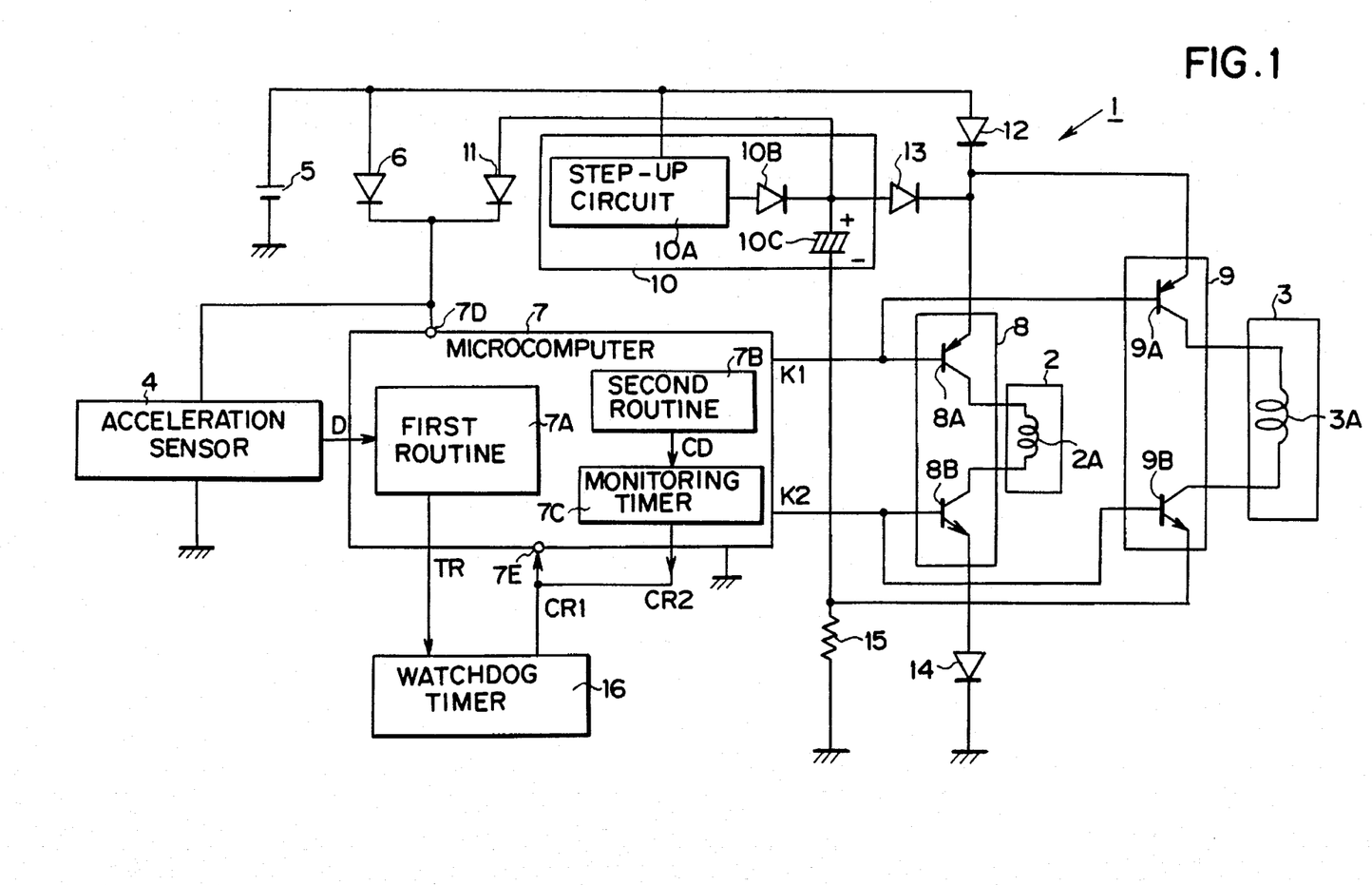
FIG. 1 is a block diagram of an embodiment of a vehicle safety system according to the present invention.

FIG. 1 shows a vehicle safety system 1 according to the present invention. As safety devices, the vehicle safety system 1 includes an air bag 2 and a seat belt tensioner 3, both of which are passenger protection devices for protecting the vehicle passengers during a collision. The vehicle safety system 1 is further equipped with an acceleration sensor 4 for detecting the acceleration of the vehicle (not shown) in which the air bag 2 and the seat belt tensioner 3 are installed. The acceleration sensor 4 produces an analog detection signal D whose level corresponds to the instantaneous acceleration of the vehicle.

The detection signal D is sent to a microcomputer 7 supplied with dc power from a battery 5 through a diode 6. The microcomputer 7 processes the detection signal D in accordance with a first routine 7A including a program for collision discrimination that will be explained later. When a collision is discriminated in the first routine 7A, the microcomputer 7 outputs first and second activation signals K1, K2. The first and second activation signals K1, K2 are applied to the bases of the switching transistors of current control circuits 8, 9 explained later.

Reference symbol 10 designates an energy reservoir comprising a step-up circuit 10A for stepping up the voltage of the battery 5 and a large-capacity capacitor 10C which is supplied with the stepped-up output of the step-up circuit 10A through a diode 10B. The capacitor 10C stores an amount of electric energy sufficient for ensuring operation of the various system components even if the supply of power from the battery 5 should be cut off owing to a collision or the like. The positive output terminal of the energy reservoir 10 is therefore connected through a diode 11 with the power input terminal 7D of the microcomputer 7 and through a diode 13 with the end of the current control circuit 8 which is connected with the positive terminal of the battery 5 through a diode 12.

The current control circuit 8 is responsive to the first and second activation signals K1, K2 for controlling the passage of ignition current from the battery 5 or the energy reservoir 10 through a squib 2A of the air bag 2 when it is to be activated. In the present embodiment, the squib 2A is connected between the collector of a PNP transistor 8A whose emitter is connected with the positive terminal of the battery 5 through the diode 12 and the emitter of a NPN transistor 8B. The emitter of the transistor 8B is connected with the negative output terminal of the energy reservoir 10 and the junction point between the emitter of the transistor 8B and the negative output terminal of the energy reservoir 10 is grounded to the vehicle body through a diode 14. The direction of the diode 14 is such that current is prevented from flowing from the body ground line to the energy reservoir 10 but is allowed to flow from the energy reservoir 10 to the body ground line. In other words, the energy reservoir 10 floats relative to the body ground line and is independent thereof.

The other switching control circuit 9 is for controlling the passage of ignition current to a squib 3A of the seat belt tensioner 3 when it is to be activated. The switching control circuit 9 comprises transistors 9A, 9B and has the same configuration as the current control circuit 8. The transistors 9A, 9B also turn on and off in response to the first and second activation signals K1, K2.

A return path for the current supplied to the microcomputer 7 from the energy reservoir 10 through the diode 11 is established by connecting the negative output terminal of the energy reservoir 10 with the body ground line through a current limiting resistor 15. The value of the current limiting resistor 15 is appropriately determined so the energy reservoir 10 is not prevented from supplying the amount of current required for operating the microcomputer 7 but so that when the current control circuit 8 or the switching control circuit 9 falls to the level of the body ground line the current flowing from the energy reservoir 10 does not exceed a prescribed level.

The microcomputer 7 will now be explained. The hardware of the microcomputer 7 is conventional. In accordance with data processing programs loaded therein, the microcomputer 7 processes the detection signal D and discriminates whether or not a collision has occurred based on changes in the level of the detection signal D. These data programs include the first routine 7A which is activated on an interrupt basis at regular time intervals for discriminating based on the detection signal D whether or not a collision has occurred and a second routine 7B for repeatedly processing background jobs. A monitoring timer 7C configured in the microcomputer 7 by software and constituting a program execution monitoring means monitors the state of execution of the second routine 7B.

For monitoring whether or not the first routine 7A is activated at the prescribed regular time intervals, the first routine 7A outputs a timer reset signal TR at a period identical with its activation period. The timer reset signal TR is supplied as a reset signal to a watchdog timer 16 provided external of the microcomputer 7. The watchdog timer 16, which is of conventional configuration, is for producing a first reset signal CR1 for resetting the microcomputer 7. It does not produce the first reset signal CR1, however, so long as it is supplied with the timer reset signal TR at the prescribed regular time intervals. On the other hand, when the interval between successive timer reset signals TR becomes longer than the prescribed time interval owing to program runaway in the first routine 7A, for example, the watchdog timer 16 outputs the first reset signal CR1 to the reset input terminal 7E of the microcomputer 7. As a result, the microcomputer 7 is reset.

The second routine 7B outputs a timer clear command code CD each time a prescribed program cycle is executed. The monitoring timer 7C is configured to have its timer value reset in response to the timer clear command code CD. The period timed by the monitoring timer 7C is set to be slightly longer than the program cycle time and if the program cycle time should become longer than the timer period owing to some problem in the execution of the second routine 7B, the monitoring timer 7C outputs a second reset signal CR2 for resetting the microcomputer 7.

During normal execution of the second routine 7B, since the timer clear command code CD is input to the monitoring timer 7C before the lapse of the timer period, the second reset signal CR2 is not produced. On the other hand, if the second routine 7B is not being executed normally owing to program runaway or the like, the interval between successive outputs of the timer clear command code CD becomes longer than the timer period and the monitoring timer 7C outputs a second reset signal CR2 to the reset input terminal 7E of the microcomputer 7. This resets the microcomputer 7 and enables it to resume normal operation.

An explanation will now be given with respect to the flow charts of the first routine 7A, the second routine 7B and the monitoring timer 7C shown in FIGS. 2, 3 and 4.

Figure 2:
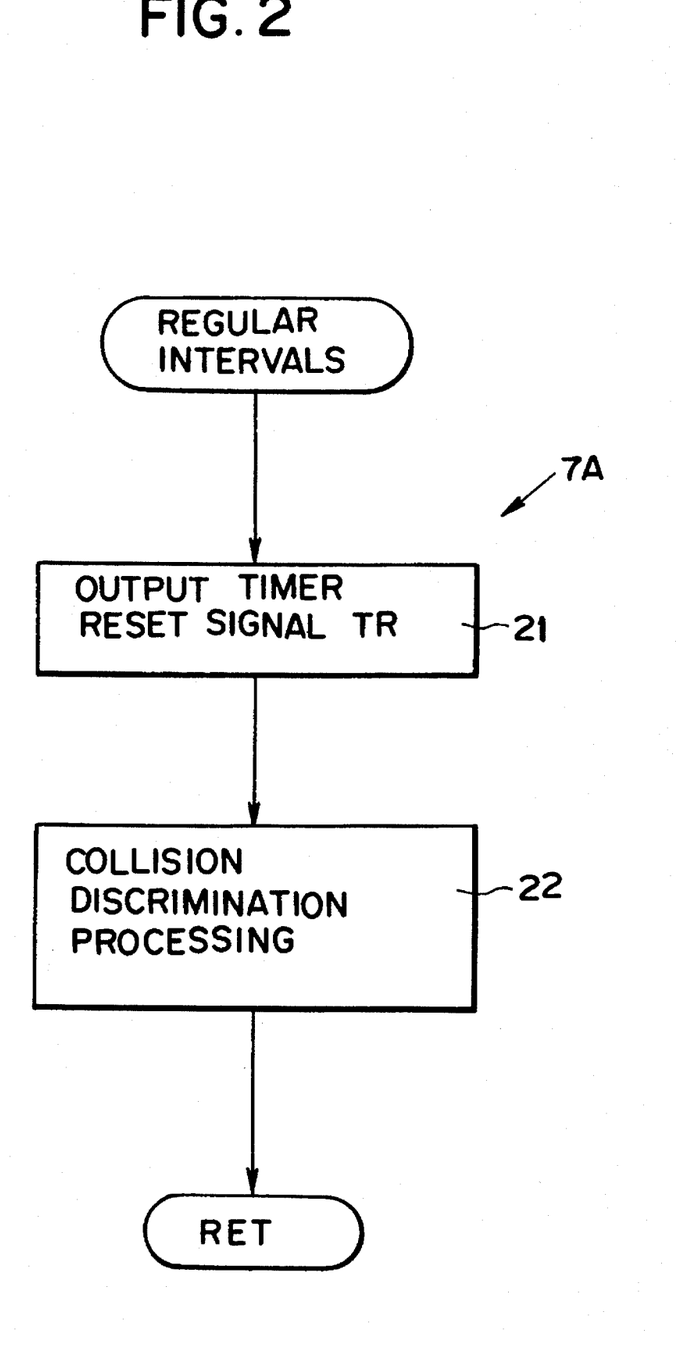
FIG. 2 is a flow chart of the first subroutine shown in FIG. 1.

The first routine 7A shown in FIG. 2 is activated at prescribed regular intervals of, say, 500 μsec. After the routine has started, the timer reset signal TR is output in step 21. This resets the watchdog timer 16. Next, in step 22, conventional collision discrimination processing is conducted based on the detection signal D for determining whether or not a collision has occurred. If the step 22 finds that a collision has occurred, the first and second activation signals K1, K2 are output for igniting the squibs 2A, 3A. If the step 22 does not find that a collision has occurred, the first and second activation signals K1, K2 are not output and the first routine 7A is terminated. If the time interval between successive outputs of the timer reset signals TR becomes longer than the timer period of the watchdog timer 16 since the collision discrimination processing step does not terminate because program runaway has arisen for some reason, the watchdog timer 16 outputs the first reset signal CR1 and the microcomputer 7 is reset.

Figure 3:
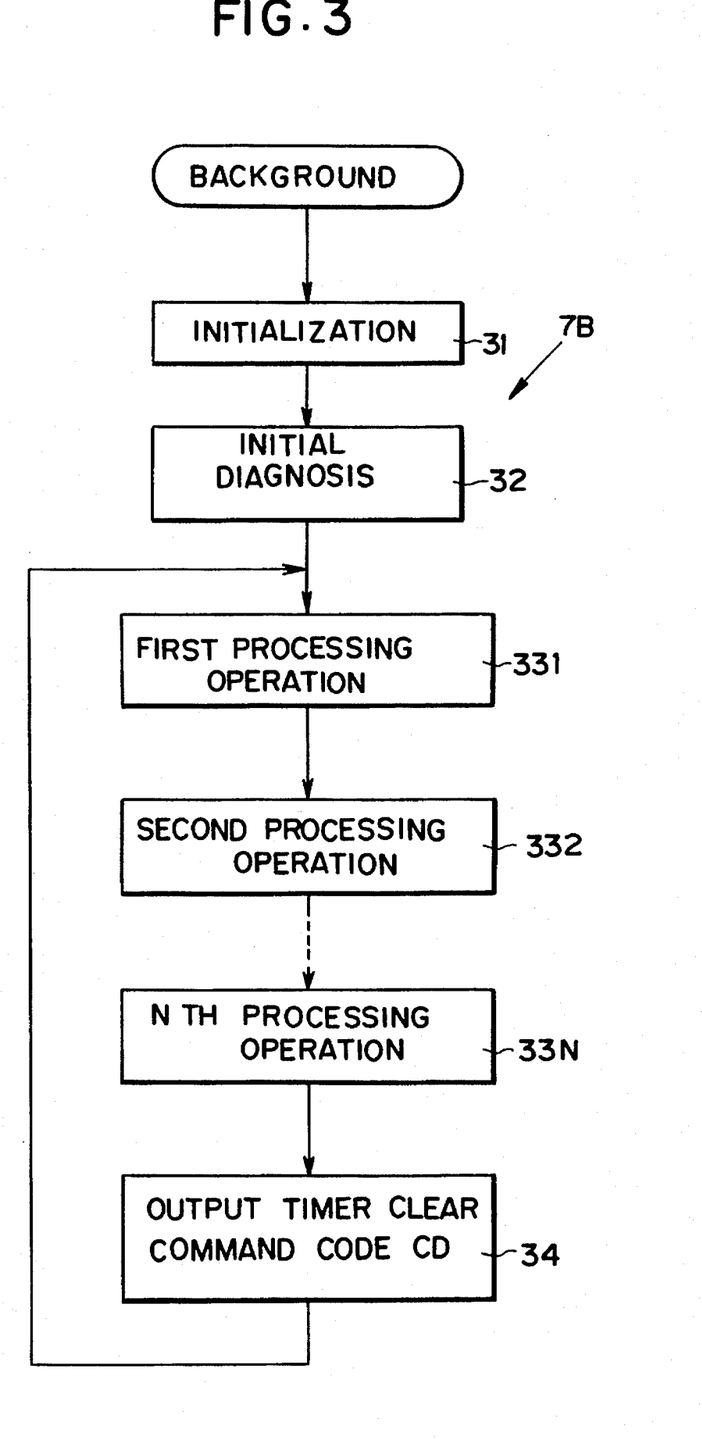
FIG. 3 is a flow chart of the second subroutine shown in FIG. 1.

The second routine 7B shown in FIG. 3 is activated when the power is turned on. After initialization has been completed in step 31, initial diagnosis is conducted in step 32 for checking the components of the vehicle safety system 1. (Since the initial diagnosis circuitry is well known, it has been omitted from FIG. 1 in the interest of simplicity.) Next, prescribed background jobs are processed one after another in steps 331 to 33N, whereafter the timer clear command code CD for clearing the monitoring timer 7C is output in step 34 and control returns to the step 331. The program cycle consisting of the steps 331 to 34 is thereafter executed repeatedly.

Figure 4:
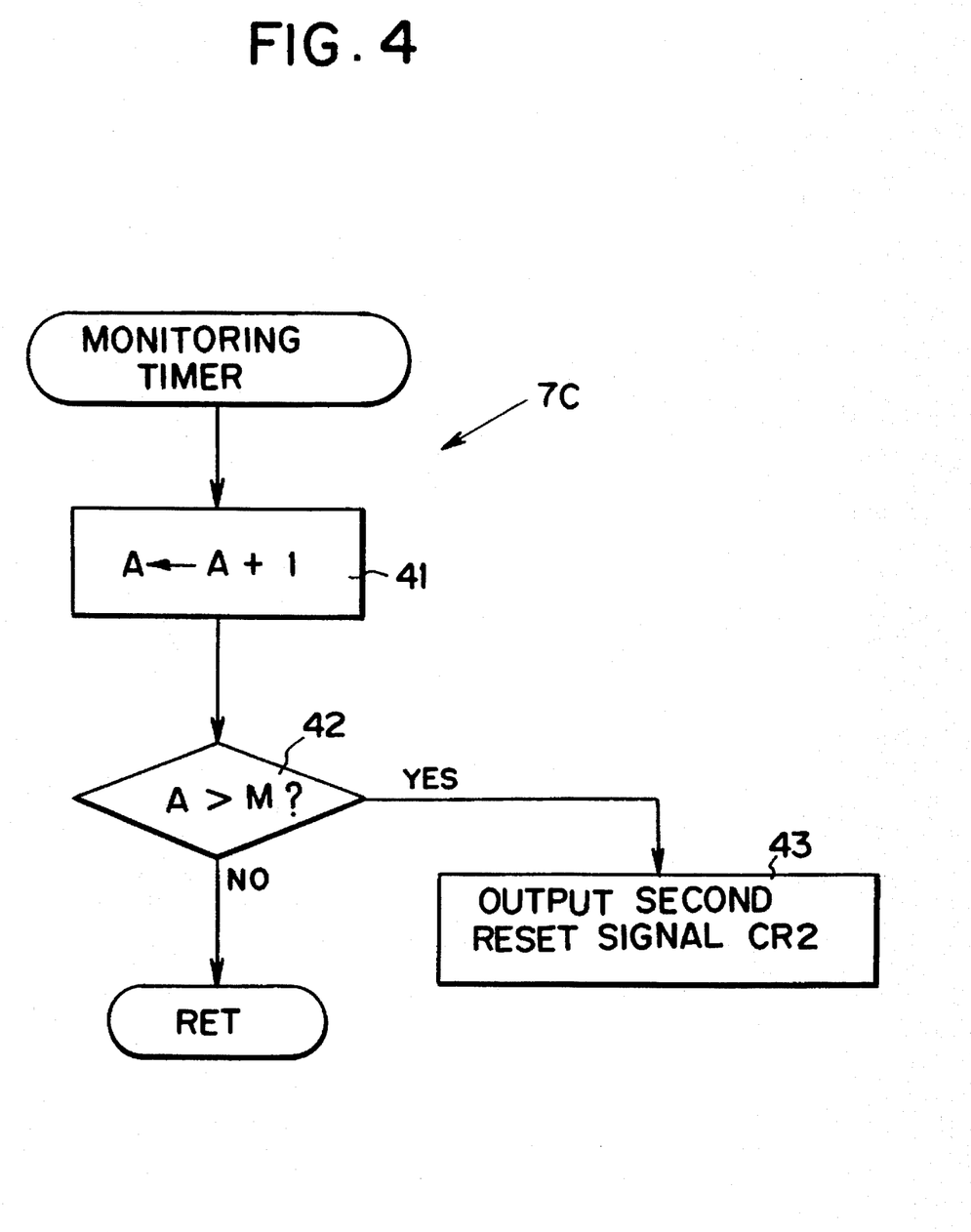
FIG. 4 is a flow chart of the monitor timer shown in FIG. 1.

The monitoring timer 7C shown in FIG. 4 is activated at regular time intervals. After the counter value A has been incremented by one in step 41, a check is made in step 42 to determine whether the counter value A has become larger than a prescribed time value M. If A≦M, another cycle of the routine is executed. The time required for the counter value A to reach the time value M is set to be slightly longer than the time required for executing one program cycle of the second routine 7B. Therefore, A>M does not occur so long as the program cycle is repeated normally. If A should become larger than M owing to program runaway or the like, however, the result of the check in the step 42 becomes YES, the second reset signal CR2 is output in step 43 and the microcomputer 7 is reset.

Figure 5:
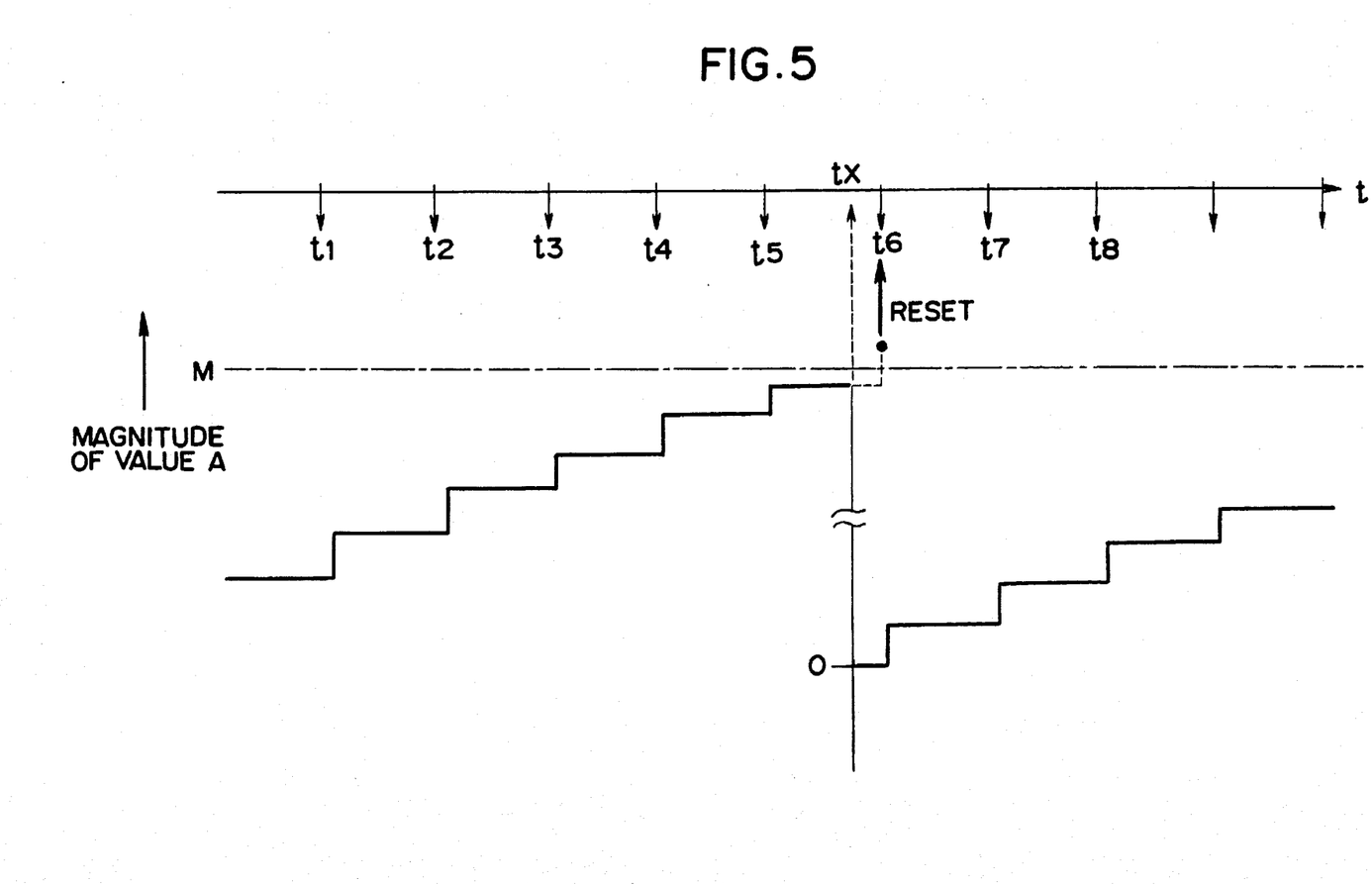
FIG. 5 is a time chart for explaining a microcomputer reset operation conducted by the monitoring timer in accordance with the flow charts shown in FIGS. 3 and 4.

The operation of the monitoring timer 7C will now be explained with reference to FIG. 5. The monitoring timer 7C is activated at times t1, t2, . . . shown in the figure. As a result, the value of A increases by one at each of t1, t2, . . . , becoming a value slightly smaller than the prescribed time value M at t5. If the second routine 7B is being executed normally, the timer clear command code CD is output at time tx prior to the next activation of the monitoring timer 7C at time t6, whereby A returns to zero. The value of A thereafter increases from zero in increments of one at times t6, t7, . . . . If the time taken to execute one program cycle of the second routine 7B should become longer than normal for some reason, however, the timer clear command code CD is not output at time tx and the value of A is increased by one at activation time t6. Since this results in A>M, the microcomputer 7 is reset.

In the vehicle safety system 1 shown in FIG. 1, therefore, the watchdog timer 16 monitors whether the first routine 7A for conducting collision discrimination is being repeatedly executed at the prescribed regular time intervals and the monitoring timer 7C, which is equivalent to a watchdog timer, monitors whether the program cycle of the second routine 7B for processing background jobs is being repeatedly executed within the prescribed time period. If program runaway occurs in either of the routines, this is detected without fail in a short period of time, the microcomputer 7 is reset, the program runaway is halted, and the data processing programs are activated again. As a result, it is possible to markedly improve the reliability of the microcomputer-based vehicle safety system 1. In the embodiment described in the foregoing, the monitoring timer 7C constituted by software in the microcomputer 7 is used for monitoring whether or not the second routine 7B is being executed normally. It will be understood, however, that it is instead possible to use a hardware timer similar to the watchdog timer 16 for this purpose.

Figure 6:
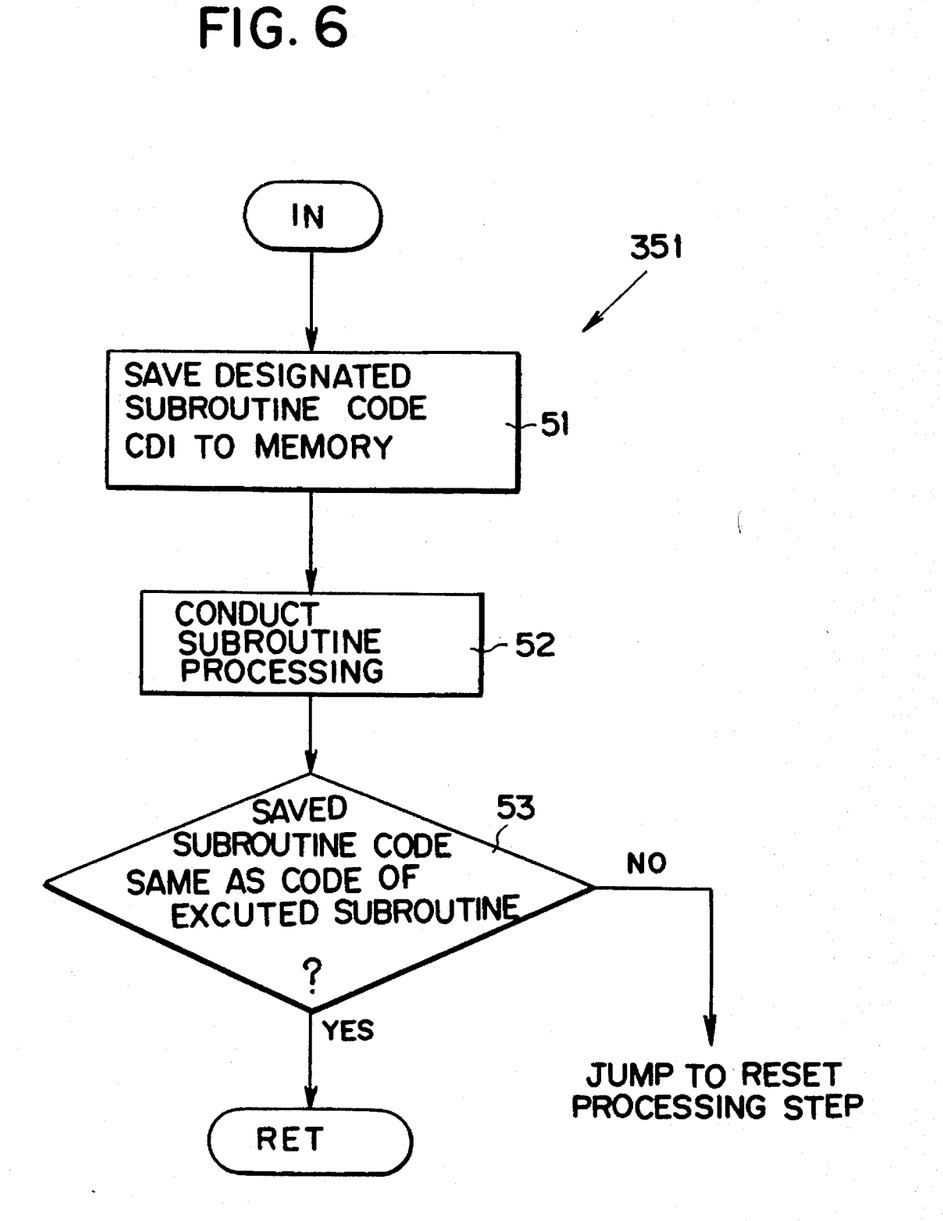
FIG. 6 is a flow chart of a subroutine program capable of checking whether or not a jump between subroutines has occurred.

The flow chart of FIG. 6 is one example of a subroutine program for effectively detecting program runaway occurring in an area of the same nesting level when the processing of background jobs is conducted by processing programs included in subroutines. The subroutine 351 shown in FIG. 6 is related to the processing conducted in the step 331 of the second routine 7B of FIG. 3. When a command is issued for execution of the subroutine 351 in the course of the processing in the step 331 step 51 saves the subroutine code CD1 of the designated subroutine 351 at a prescribed address of a memory area of the microcomputer 7 reserved for this purpose beforehand. Then after the prescribed subroutine has been executed in the following step 52, a check is made in the step 52 whether the subroutine code CD1 saved to memory in the step 51 coincides with the subroutine code of the subroutine that was actually executed.

If the subroutine designated in the first processing operation (the step 331) has been properly executed, the subroutine code stored in its entry portion and the subroutine code confirmed at its exit portion will be identical. The decision in the step 53 will therefore be YES and control is returned to the step 331. On the other hand, if in the course of the execution of the subroutine designated in the first processing operation (the step 331) a jump occurs to another subroutine of the same nesting level, the decision in the step 53 becomes NO and control jumps to a reset processing step, e.g. to the step 43 of the monitoring timer 7C, and the microcomputer 7 is reset.

Although the foregoing explanation was limited to the subroutine program configuration relating to the first processing operation (the step 331), the subroutine programs executed in the other processing steps of the second routine 7B are similarly configured. Therefore, during the execution of each subroutine in the second routine 7B a check is made as to whether the subroutine code saved to memory at the entry portion is the same as that at the exit portion, whereby it is possible to ascertain with high certainty whether or not a jump has occurred between subroutines in an area of the same nesting level. If a jump between subroutines is discovered, the microcomputer 7 is reset, thereby preventing malfunctioning of the activation control of the air bag and the like.

In the vehicle safety system 1 described in the foregoing, the watchdog timer 16 is provided as means for monitoring whether or not the collision discrimination program that is run within a fixed-time interrupt routine is being executed normally and is further provided with the monitoring timer 7C as means for monitoring whether or not program runaway has occurred in the background subroutines for processing background jobs. It is therefore possible to reliably detect various types of execution errors occurring during running of the programs. When an error is detected, moreover, the microcomputer 7 is reset to prevent erroneous activation of the vehicle safety devices (the air bag 2 and the seat belt tensioner 3).

Further, a preferred embodiment of the invention is configured to monitor whether or not the subroutine designated at the entry portion is identical with the subroutine specified at the exit portion. This arrangement makes it possible to ascertain with a high degree of certainty whether or not a jump has occurred between subroutines in an area of the same nesting level, and when one does occur, to reset the microcomputer 7 so as to reliably prevent erroneous activation of the vehicle safety devices (the air bag 2 and the seat belt tensioner 3).

What is claimed is:

1. A vehicle safety system having a sensor for detecting vehicle acceleration and a microcomputer for processing the sensor output and in which the microcomputer executes a collision discrimination program on an interrupt basis at prescribed regular time intervals based on the sensor output for discriminating whether or not a collision has occurred and repeatedly executes a background program for processing prescribed background jobs, thereby controlling activation of the vehicle safety devices, the system further comprising:

first monitoring means for monitoring whether or not the collision discrimination program is being properly executed based on whether or not the time for executing one program cycle of the collision discrimination program is longer than a prescribed value, a second monitoring means for monitoring whether or not the background program is being properly executed based on whether or not the time for executing one program cycle of the background program is longer than a prescribed value, and reset means for resetting the microcomputer when at least one of the first and second monitoring means detects an error in program execution.

2. A system as claimed in claim 1, wherein the first monitoring means comprises means for outputting a first timer reset signal at the execution of each program cycle of the collision discrimination program and first timer means operative in response to the first timer reset signal for outputting a first reset signal when the time for executing one program cycle of the collision discrimination program becomes longer than a prescribed value.

3. A system as claimed in claim 2, wherein the first timer means is a watchdog timer.

4. A system as claimed in claim 2, wherein the reset means is a means provided in the microcomputer for resetting the microcomputer in response to a signal from outside and is supplied with the first reset signal.

5. A system as claimed in claim 2, wherein the reset means is a means provided in the microcomputer for resetting the microcomputer in response to a signal from outside and is supplied with the second reset signal.

6. A system as claimed in claim 1, wherein the second monitoring means comprises means for outputting a second timer reset signal at the execution of each program cycle of the background program and second timer means operative in response to the second timer reset signal for outputting a second reset signal when the time for executing one program cycle of the background program becomes longer than a prescribed value.

7. A system as claimed in claim 6, wherein the second timer means is a monitoring timer means having a timer period slightly longer than the time for executing one program cycle of the background program.

8. A vehicle safety system having a sensor for detecting vehicle acceleration and a microcomputer for processing the sensor output and in which the microcomputer executes a collision discrimination program on an interrupt basis at prescribed regular time intervals based on the sensor output for discriminating whether or not a collision has occurred and repeatedly executes a background program for processing prescribed background jobs, thereby controlling activation of the vehicle safety devices, the system further comprising:

means for outputting a first timer reset signal at the execution of each program cycle of the collision discrimination program, first timer means operative in response to the first timer reset signal for outputting a first reset signal when the time for executing one program cycle of the collision discrimination program becomes longer than a prescribed value, means for outputting a second timer reset signal at the execution of each program cycle of the background program, second timer means operative in response to the second timer reset signal for outputting a second reset signal when the time for executing one program cycle of the background program becomes longer than a prescribed value, and reset means responsive to the first and second reset signals for resetting the microcomputer when the time for executing one program cycle of the collision discrimination program becomes longer than the prescribed value or when the time for executing one program cycle of the background program becomes longer the prescribed value.

9. A method of controlling a vehicle safety system having a sensor for detecting vehicle acceleration and a microcomputer for processing the sensor output and in which the microcomputer executes a collision discrimination program on an interrupt basis at prescribed regular time intervals based on the sensor output for discriminating whether or not a collision has occurred and repeatedly executes a background program for processing prescribed background jobs, thereby controlling activation of the vehicle safety devices, the method comprising:

a first monitoring step for monitoring whether or not a collision discrimination program is being properly executed based on whether or not the time for executing one program cycle of the collision discrimination program is longer than a prescribed value,     a second monitoring step for monitoring whether or not a background program is being properly executed based on whether or not the time for executing one program cycle of the background program is longer than a prescribed value, and     a step for resetting the microcomputer when at least one of the first and second monitoring steps detects an error in program execution.

10. A vehicle safety system having a sensor for detecting vehicle acceleration and a microcomputer for processing the sensor output and in which the microcomputer executes a collision discrimination program on an interrupt basis at prescribed regular time intervals based on the sensor output for discriminating whether or not a collision has occurred and repeatedly executes a background program for processing prescribed background jobs, thereby controlling activation of the vehicle safety devices, the system further comprising:

means for at the entry portion of the subroutine of each data processing program executed in the microcomputer saving to memory a code peculiar to the subroutine concerned,     comparing means for at the exit portion of each subroutine comparing the code of the executed subroutine with the saved code,     checking means responsive to the comparing means for checking whether or not the data processing program was properly executed, and     reset means for resetting the microcomputer in accordance with the result of the check by the checking means.

\* \* \* \* \*